United States Patent Office 3,578,651
Patented May 11, 1971

3,578,651
ACYLATED LIGNOSULFONATES
Charles H. Ludwig, Bellingham, Wash., assignor to
Georgia-Pacific Corporation, Portland, Oreg.
No Drawing. Filed May 6, 1968, Ser. No. 727,053
Int. Cl. C07g 1/00
U.S. Cl. 260—124                                    15 Claims

ABSTRACT OF THE DISCLOSURE

A process for the acylation of lignosulfonate by the reaction, in an organic solvent, of a trialkylammonium lignosulfonate salt with a halide of carboxylic or sulfonic acid and products thereof.

This invention pertains to the preparation of acylated products of lignosulfonates by the reaction of lignosulfonates with a carboxylic acid halide or a sulfonic acid halide and products thereof.

Sulfonated lignin - containing materials comprising mainly sulfonated products of lignin, or lignosulfonates and salts thereof, are essentially the sulfonated noncellulosic portion of a lignocellulosic material. Lignin is a polymeric substance of substituted aromatics found in plant and vegetable tissue associated with cellulose and other constituents. While there is some variation in the chemical structure of lignin and of other noncellulosic constituents found in the plant, depending upon the type of plant, place where it is grown, and also upon the method used in recovery or isolation of the particular constituents from the plant tissue, the basic structure and properties of these materials upon sulfonation are similar and form the well known group of materials commonly referred to as "lignosulfonate" or "lignosulfonates."

One of the main sources of lignosulfonates is the residual pulping liquors obtained in the pulp and paper industry where lignocellulosic materials such as wood, straw, corn stalks, bagasse and the like are processed to recover the cellulose or pulp. In the sulfite pulping process, the lignocellulosic material is digested with a bisulfite or sulfite solution to obtain a sulfonated residual pulping liquor commonly referred to as "spent sulfite liquor" containing the sulfonated lignin products. In other pulping processes, the residual pulping liquor as obtained from the process may not be a sulfonated product. However, the residual liquor or products containing the lignin portion of the lignocellulosic materials from the sulfite or other processes may be treated by the various known methods to sulfonate the product to the degree desired. Vegetable and plant tissue contain up to about 30% lignin. Thus, large amounts of lignin are available.

Considerable effort has been expended in lignosulfonate research, without too much success, in the development of methods or processes to utilize more fully these materials. The acylation of lignosulfonates has been disclosed in the U.S. Letters Patent No. 2,419,783 by the reaction of a sodium lignosulfonate salt with a fatty acid chloride. Also, methods have been proposed where lignosulfonic acid has been reacted with acetic acid chloride or the short chained, low molecular weight acids. While the methods disclosed may function satisfactorily for the short chained acids, high molecular weight acids or acids containing long alkyl chains do not readily interact with lignosulfonate in appreciable amounts under these conditions.

It is, therefore, an object of this invention to provide an improved process for the acylation of lignosulfonate with carboxylic and sulfonic acid halides. A further object is to provide a process for the acylation of lignosulfonate wherein an increased number of the acid groups are condensed with the lignosulfonate to form the ester. A still further object is to provide acylated lignosulfonate products having a large ratio of the long chained acid groups condensed with the lignosulfonate.

The above and other objects are attained, according to this invention, by reacting a trialkylammonium lignosulfonate with a carboxylic acid or sulfonic acid halide under substantially anhydrous conditions in an organic solvent in the presence of a base. In carrying out the reaction under the above conditions, a sufficient amount of acid may be condensed with the lignosulfonate to obtain a product containing up to 45% by weight of acid radicals. The products thus obtained with acids containing long chain alkyl radicals are especially effective as water-in-oil emulsifiers.

While lignosulfonate or the sulfonated lignin used in the reaction may come from any source, sulfonated residual pulping liquors are most commonly used. Sulfonated residual pulping liquor, such as spent sulfite liquor or sulfonated kraft pulping liquor, contain many other constituents besides the lignosulfonate. The liquors may contain carbohydrates, degradation products of carbohydrates, and resinous material as well as other organic and inorganic compounds. The lignosulfonate constituents may be recovered from these liquors by any of the various known methods, for example, dialysis, ion exchange, or precipitation by use of alkali or acid, and then reacted with the tertiary amine to obtain the lignosulfonate as the trialkylammonium salt.

A common method of recovering lignosulfonates from sulfonated lignin-containing material is by precipitation or extraction of the sulfonated lignin from the liquor as a salt formed by the reaction of the lignosulfonate with the relatively high molecular weight amines. The water solubility of the amine salts of lignosulfonate is limited and may be thus precipitated from the solution or extracted from the aqueous medium with organic solvents. While primary, secondary, or tertiary amines may be used for the recovery of lignosulfonate, it is most convenient to recover the lignosulfonate as the trialkylammonium salt desired to be used in the ester formation or acylation reaction. The conversion of the lignosulfonate to the trialkylammonium salt may be thus combined with the recovery of the lignosulfonate from the residual pulping liquor or sulfonated lignin-containing material. Alkyl tertiary amines having up to 26 carbon atoms may be used. Preferably, trialkylamines having alkyl groups of from 3 to 7 carbon atoms each are employed, since the corresponding trialkylammonium lignosulfonate salts obtained are preferred in the ester derivative formation reaction.

Although the process is especially effective for long chained acids, it may also be used in the preparation of esters of short chained acids. Examples of the carboxylic acid halides or sulfonic acid halides which may be employed are the aliphatic acid halides having from 2 to about 26 carbon atoms such as the halides of acetic acid, propionic acid, butyric acid and others, including the long chained acids; for example, stearic, lauric and palmitic acids and the analogous sulfonic acids. Also, aromatic, alkylaromatic and arylaliphatic acids, such as benzoic, naphthoic, anthracene carboxylic, phenylacetic, p-nonylbenzoic, and p-nonylbenzene-sulfonic acids may be used. The monobasic carboxylic and sulfonic acids are preferred. These form esters with the lignosulfonate with a minimum of crosslinking as compared with the di- or tribasic acids. The monobasic esters generally are effective emulsifying agents, while the products prepared with di-, or tri-, or polycarboxylic acids may be crosslinked to the extent that high molecular weight resins are obtained. The carboxylic and sulfonic acids may be converted to the acid halide by any of the well known methods. The chloride is the preferred halide but other halogens such as bromine, may also be used.

The reaction between the acid halide and the trialkylammonium salt of lignosulfonate is carried out in a solvent medium, or a medium in which the reactants are at least partially soluble. Substantially anhydrous conditions are maintained. However, it is not necessary that the conditions be absolutely anhydrous. Small amounts of water can be present, but the water may react with the acid halide resulting in not only a loss of the reactant but also in the formation of an undesired by-product.

In the acylation reaction of the lignosulfonate salt with the acid halide, an acid is formed by the combination of hydrogen with the halogen. The acid is removed from the reaction mixture to keep the acidity of the reaction mixture from increasing to the extent that the condensation reaction between the lignosulfonate and acid halide is checked before substantial completion. Thus, the reaction is carried out in the presence of a base which will react with the acid and remove it from the reaction mixture as it is formed. The addition of a small amount of pyridine or other suitable tertiary organic bases such as dimethyl aniline and others may be used. Preferably, it is desirable to have a base which will dissolve in the solvent. However, it is not necessary, since the base may effectively scavenge the acid by just being dispersed in the reaction mixture.

The reaction may be carried out by intermixing the trialkylammonium lignosulfonate salt with the acid chloride in an organic solvent such as, for example, the polyhalogenated alkanes as chloroform, and the like. In addition to the above, pyridine is an excellent solvent and thus may be used as a reaction medium. When so used it not only functions as a solvent but also as the acid acceptor.

Generally, the reaction is effected at about room temperature or in the range of from about 20° to 35° C. However, the reaction between the lignosulfonate salt and the acid halide is rapid and may be carried out at temperatures as low as 0° C. or lower. Temperatures up to about 120° C. or the thermal decomposition temperature of the acid halides may also be used. The reaction is seldomly carried out at these high temperatures, but it may be convenient to have the reaction mixture refluxed at the boiling point of the solvent. The reaction time to substantially complete the reaction will vary with the temperature employed. At the lower temperatures for example, below 10° C., it may require from 12 to 24 hours to obtain appreciable condensation of the reactants to the ester. However, at the higher temperatures the reaction may be substantially completed by the time the reaction mixture is heated to the temperature. At room temperature, a reaction time in a range of from 4 to 12 hours may be used which may be decreased to about ½ to 2 hours at a reaction temperature in the range of 35° to 50° C.

The acylated product as obtained is the ester of the trialkylammonium lignosulfonate. It can be used as such or it may be converted to a salt of the acylated lignosulfonate other than the tertiary ammonium. The various known means may be used for the replacement of the trialkylammonium cations associated with the sulfonate groups with other cations. A convenient method for the conversion of the tertiary ammonium salt to alkali or alkaline earth metal is by treating the salt with an alkali of the particular cation desired, for example, a carbonate, bicarbonate, or hydroxide. The reaction may be carried out by dissolving the trialkylammonium salt of the acylated lignosulfonate in an organic solvent in which water is not readily soluble, such as, for example, butanol, and then treating the solution with an aqueous solution of the alkali.

The interaction of the acid halide with the lignosulfonate to the extent of obtaining a product containing from 25 to 45 weight percent of acid radicals materially affects the characteristics and properties of the product. The products so obtained, upon acylation with a long chained monobasic carboxylic or sulfonic acid having from 8 to 26 carbon atoms, are especially effective as emulsifiers for water-in-oil emulsion.

To further illustrate the invention, a triamylammonium lignosulfonate ester of stearic acid was prepared from a sulfonated residual pulping liquor.

The residual pulping liquor, a fermented calcium base spent sulfite liquor, containing 32 weight percent of solids was used. About 5,000 grams of the liquor were acidified with about 430 grams of 50% sulfuric acid, and the mixture filtered to remove the precipitated calcium sulfate. To the clarified liquor, triamylamine was added in a ratio of 2 parts of amine to 5 parts of the spent sulfite liquor solids to precipitate the lignosulfonate. The resulting precipitate was purified by being dissolved in butanol and washed with water. The water dissolved in the butanol phase was removed under reduced pressure and the product precipitated in ethyl ether and then dried.

In the preparation of the triamylammonium salt of the acylated lignosulfonate, the lignosulfonate salt in an amount of about 10 grams was dissolved in 100 milliliters of pyridine. Stearoyl chloride in an amount of 13.5 grams was added slowly to the lignosulfonate solution which was being agitated at room temperature. The reaction mixture was allowed to stand overnight, precipitated over cracked ice, and then filtered to recover the stearic acid acylated triamylammonium lignosulfonate. The product was washed with dilute hydrochloric acid and then water until the washings had a pH of 4.5. Sixteen grams of dry product were obtained. A portion of the product obtained was extracted with acetone to remove any unreacted stearic acid remaining in the product.

The methoxyl determination before and after the reaction of the triamylammonium lignosulfonate was 9.0 and 5.1, respectively. Thus, the amount of stearic acid condensed with the lignosulfonate was about 43% of the final product which indicated that about 0.86 mole of stearate were added for each methoxyl group or phenylpropane group of the lignosulfonate. In the infrared spectrum, a strong distinct ester carbonyl band at about 5.75 microns is obtained having about the same intensity as the aromatic carbon-carbon stretching band at about 6.63 microns.

A triamylamine salt of the stearoylated lignosulfonate prepared in the manner similar to that described above, was converted to the sodium salt of the ester. The triamylamine salt of stearolylated lignosulfonate, in an amount of 20 grams, was dissolved in 360 milliliters of butanol. The solution was then mixed with a 5% solution of sodium bicarbonate. The sodium salt of the stearoylated lignosulfonate separated as a thick brown viscous material in the butanol phase of the mixture. The product was further mixed with 100 milliliters of butanol and water and recovered as an emulsion with the water phase. The emulsion was washed with light petroleum ether and then dried.

Both the triamylamine salt of the stearoylated lignosulfonate and sodium salt of stearoylated lignosulfonate were tested as emulsifiers and both were found to be excellent water-in-oil emulsifiers.

What is claimed is:

1. An acylated lignosulfonate product containing from 25 to 45 weight percent of acid radicals of an acid selected from the group consisting of aliphatic carboxylic acids and aliphatic sulfonic acids having from 8 to 26 carbon atoms.

2. A product according to claim 1 wherein the acid radical is a monobasic aliphatic sulfonic acid radical.

3. A product according to claim 1 wherein the acid radical is a monobasic aliphatic carboxylic acid radical.

4. A process for the acylaton of lignosulfonate, which comprises intermixing a trialkylammonium salt of lignosulfonate with an acid halide under substantially anhydrous conditions in a solvent selected from the group consisting of pyridine and chloroform and in the presence of a tertiary amine base to react the acid halide with the lignosulfonate to form the acid ester, said trialkylammonium salt of lignosulfonate being a salt of a trialkylamine alkyl substituents of from 3 to 7 carbon atoms, said acid halide being selected from the group consisting of carboxylic acid halides and sulfonic acid halides, and said halides being of a halogen having an atomic number in the range of 17 to 35.

5. A process according to claim 4 wherein the trialkylammonium salt of lignosulfonate is a salt of a triamylamine.

6. A process according to claim 4 wherein the solvent and the tertiary amine base is pyridine.

7. A process according to claim 4 wherein the acid halide is a monobasic carboxylic acid halide.

8. A process according to claim 4 wherein the acid halide is a monobasic carboxylic acid halide.

9. A process according to claim 8 wherein the carboxylic acid halide is a carboxylic acid chloride having from 8 to 26 carbon atoms.

10. A process for the acylation of sulfonated lignin, which comprises intermixing a trialkylamine having alkyl substituents of from 3 to 7 carbon atoms with a sulfonated lignin-containing material to react the amine with the sulfonated lignin to obtain a trialkylammonium salt of sulfonated lignin, recovering the trialkylammonium salt of sulfonated lignin, reacting the trialkylammonium salt of sulfonated lignin with an acid halide under substantially anhydrous conditions in a solvent selected from the group consisting of pyridine and chloroform and in the presence of a tertiary amine base to acylate the sulfonated lignin, said acid halide being selected from the group consisting of carboxylic acid halides and sulfonic acid halides, said halides being of a halogen having an atomic number in the range of 17 to 35, and recovering the acylated sulfonated lignin from the reaction mixture.

11. A process according to claim 10 wherein the sulfonated lignin-containing material is a spent sulfite liquor.

12. A process according to claim 11 wherein the solvent and the tertiary amine base is pyridine.

13. A process according to claim 12 wherein the acid halide is a monobasic aliphatic sulfonic acid halide having from 8 to 26 carbon atoms.

14. A process according to claim 12 wherein the acid halide is a monobasic carboxylic acid halide.

15. A process according to claim 14 wherein the carboxylic acid halide is a fatty acid chloride having from 8 to 26 carbon atoms.

References Cited

Brauns: "The Chem. of Lignin" (1952), pp. 279–81.

CHARLES B. PARKER, Primary Examiner

D. R. PHILLIPS, Assistant Examiner

UNITED STATES PATENT OFFICE
CERTIFICATE OF CORRECTION

Patent No. 3,578,651     Dated May 11, 1971

Inventor(s)  Charles H. Ludwig

It is certified that error appears in the above-identified patent and that said Letters Patent are hereby corrected as shown below:

Column 4, line 75, before "alkyl", insert ---having---.

Column 5, line 11, delete "carboxylic" and insert in its place ---sulfonic---.

Signed and sealed this 3rd day of August 1971.

(SEAL)
Attest:

EDWARD M. FLETCHER, JR.
Attesting Officer

WILLIAM E. SCHUYLER, JR.
Commissioner of Patents